(12) United States Patent
Garbett et al.

(10) Patent No.: US 6,348,124 B1
(45) Date of Patent: *Feb. 19, 2002

(54) DELIVERY OF POLISHING AGENTS IN A WAFER PROCESSING SYSTEM

(75) Inventors: Matthew G. Garbett, San Jose; Robert D. Tolles, Santa Jose; John S. Hearne, Los Altos; Manoocher Birang, Los Gatos, all of CA (US)

(73) Assignee: Applied Materials, Inc., Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/461,685

(22) Filed: Dec. 14, 1999

(51) Int. Cl.[7] ............................ G05D 11/00; B65D 83/00
(52) U.S. Cl. ............................................ 156/345; 222/1
(58) Field of Search ............................ 156/345; 216/85, 216/88, 89; 222/1, 63, 33, 135; 366/136, 160; 451/446; 251/5, 60

(56) References Cited

U.S. PATENT DOCUMENTS

| | | | | |
|---|---|---|---|---|
| 4,059,929 A | * | 11/1977 | Bishop | ........................... 222/1 |
| 4,095,722 A | * | 6/1978 | Miller | ........................... 222/1 |
| 4,224,281 A | * | 9/1980 | Thieme et al. | .............. 422/100 |
| 5,020,917 A | * | 6/1991 | Homan | ........................ 222/134 |
| 5,385,081 A | * | 1/1995 | Sneddon | ..................... 222/386 |
| 5,407,526 A | | 4/1995 | Danielson et al. | |
| 5,464,121 A | * | 11/1995 | Jones | ............................ 222/1 |
| 5,467,899 A | * | 11/1995 | Miller | ......................... 222/309 |
| 5,527,161 A | | 6/1996 | Bailey et al. | |
| 5,630,527 A | | 5/1997 | Beebe et al. | |
| 5,750,440 A | | 5/1998 | Vanell et al. | |
| 5,804,507 A | * | 9/1998 | Perlov et al. | ................ 156/345 |
| 5,887,974 A | | 3/1999 | Pozniak et al. | |
| 6,010,032 A | * | 1/2000 | Vermylen et al. | ............... 222/1 |

* cited by examiner

Primary Examiner—Jeffrie R. Lund
Assistant Examiner—Sylvia R MacArthur
(74) Attorney, Agent, or Firm—Fish & Richardson

(57) ABSTRACT

A polishing agent delivery system for a wafer processing system includes multiple tanks each of which can hold a supply of a respective polishing agent constituent, such as a slurry constituent, a buffing agent or a cleansing agent. The system also includes multiple containers, each one of which can hold a respective polishing agent constituent. Additionally, each container has a motor-driven piston that can be operated to cause the respective polishing agent constituent to be dispensed from the container to a wafer processing station and which can be operated to cause additional polishing agent constituent to be drawn into the container from a corresponding one of the tanks. The apparatus also includes a controller for controlling a respective rate of linear displacement of each motor-driven piston. Stepper motors or servo-motors can be used. The system allows changes to slurry mixtures to be made quickly and efficiently, and different slurry or buffing mixtures can be used for different polishing stations. Furthermore, the system can provide tight control over the dispensing operations so that precise, predetermined amounts of each constituent are mixed into the slurry. The system is highly modular which can facilitate the delivery of slurry or other polishing agents to additional polishing stations. The rate at which various polishing agent constituents are delivered to a wafer polishing station can be altered dynamically during a wafer polishing cycle or between cycles.

11 Claims, 6 Drawing Sheets

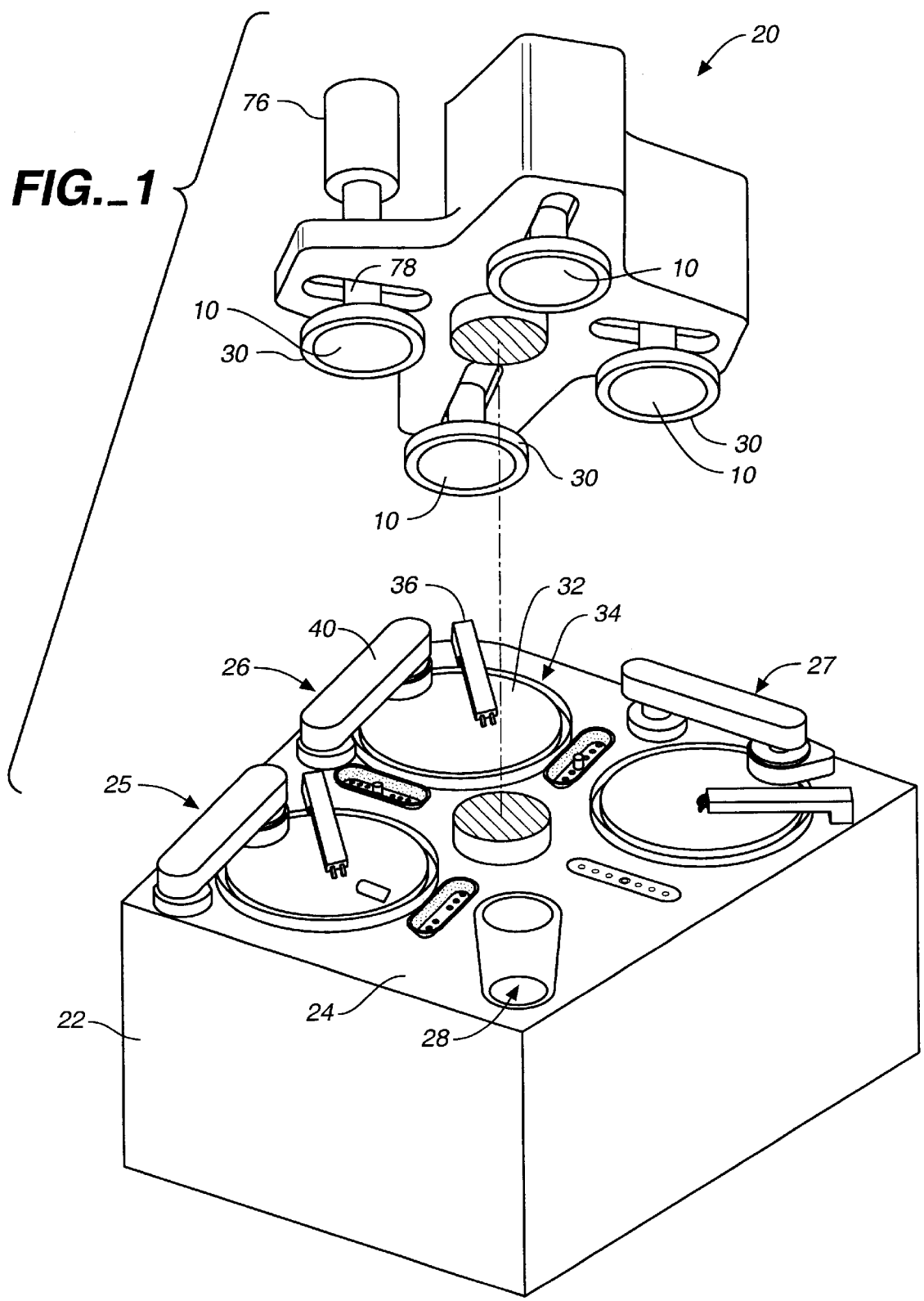
FIG._1

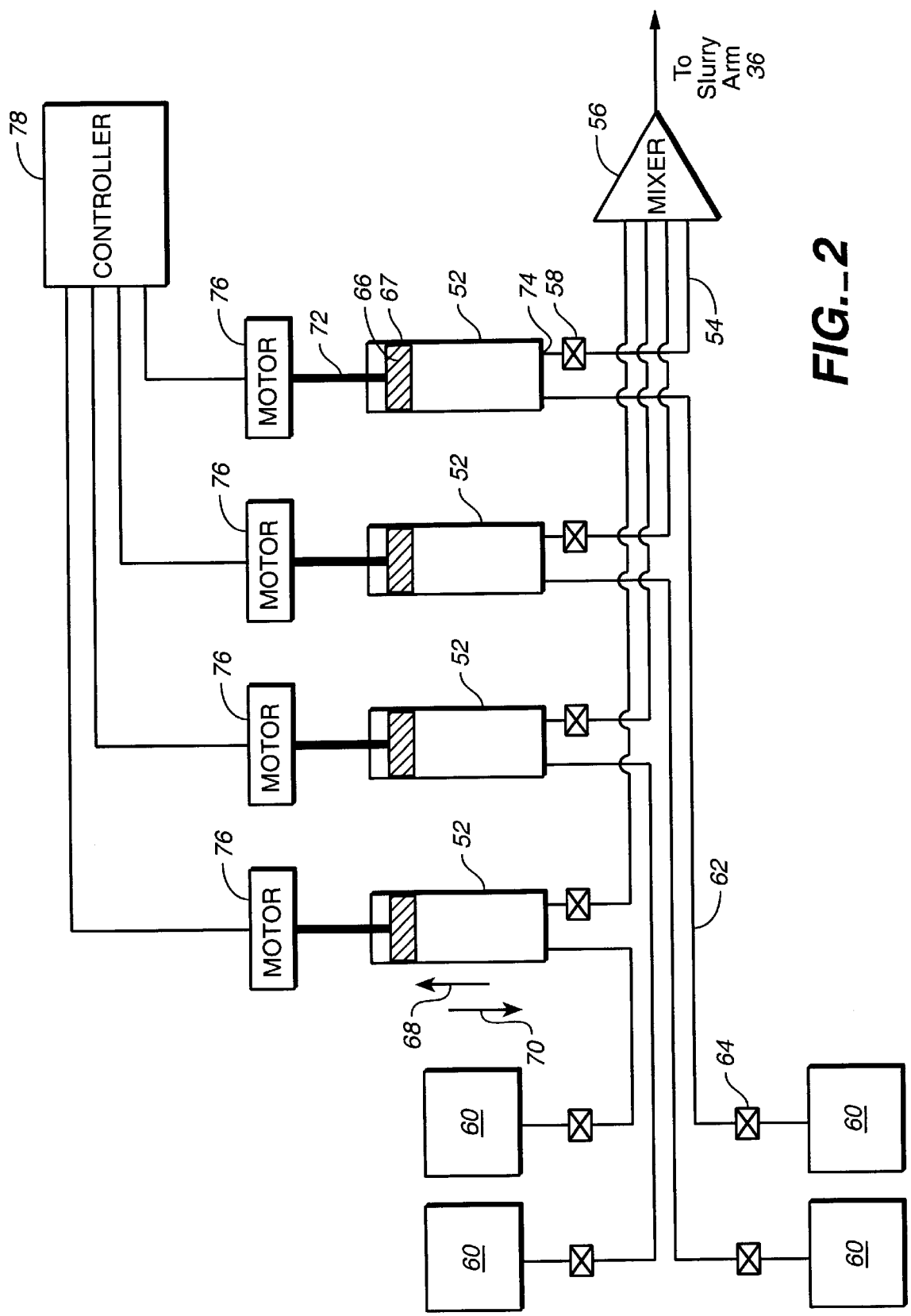
FIG._2

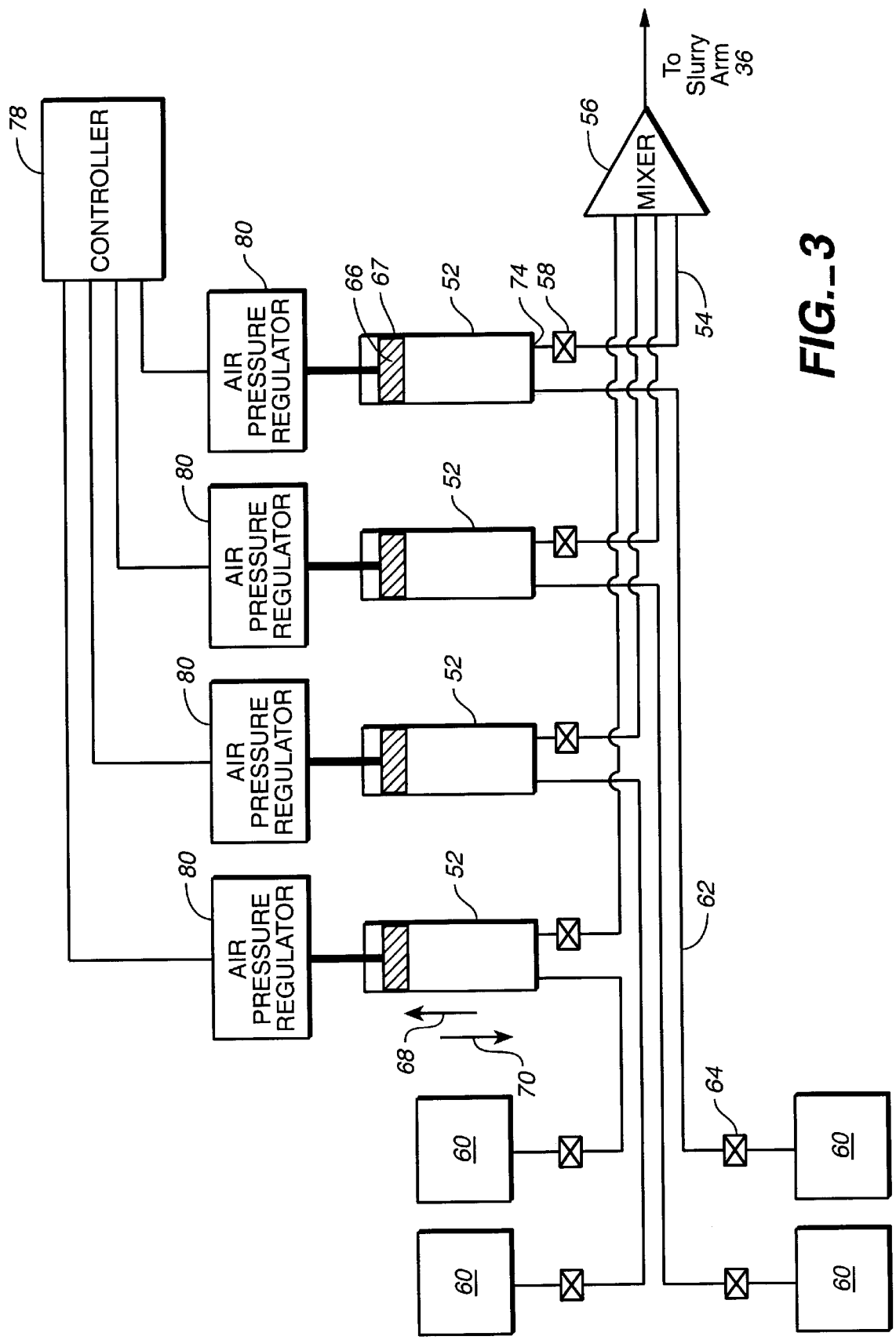
FIG._3

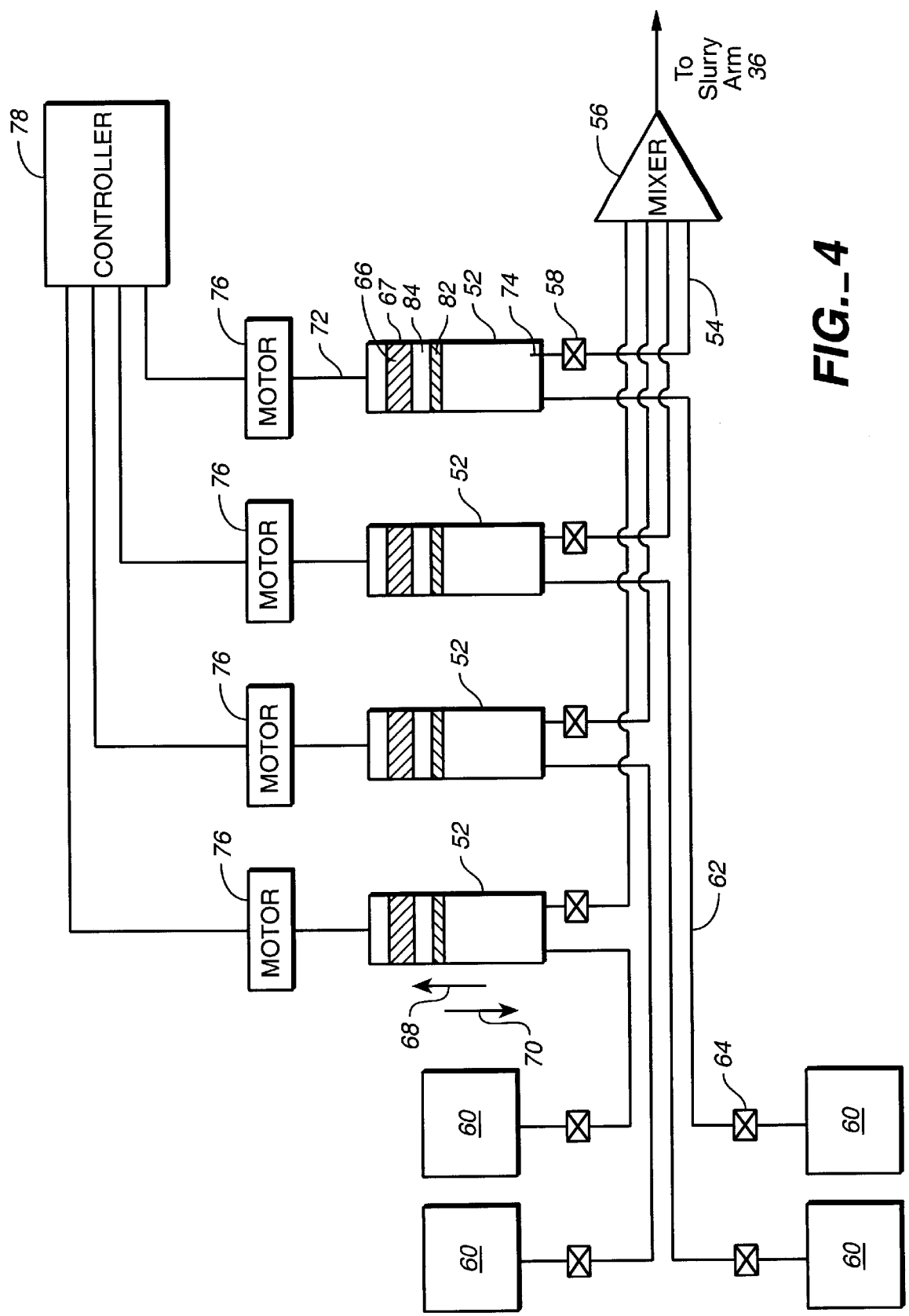
FIG._4

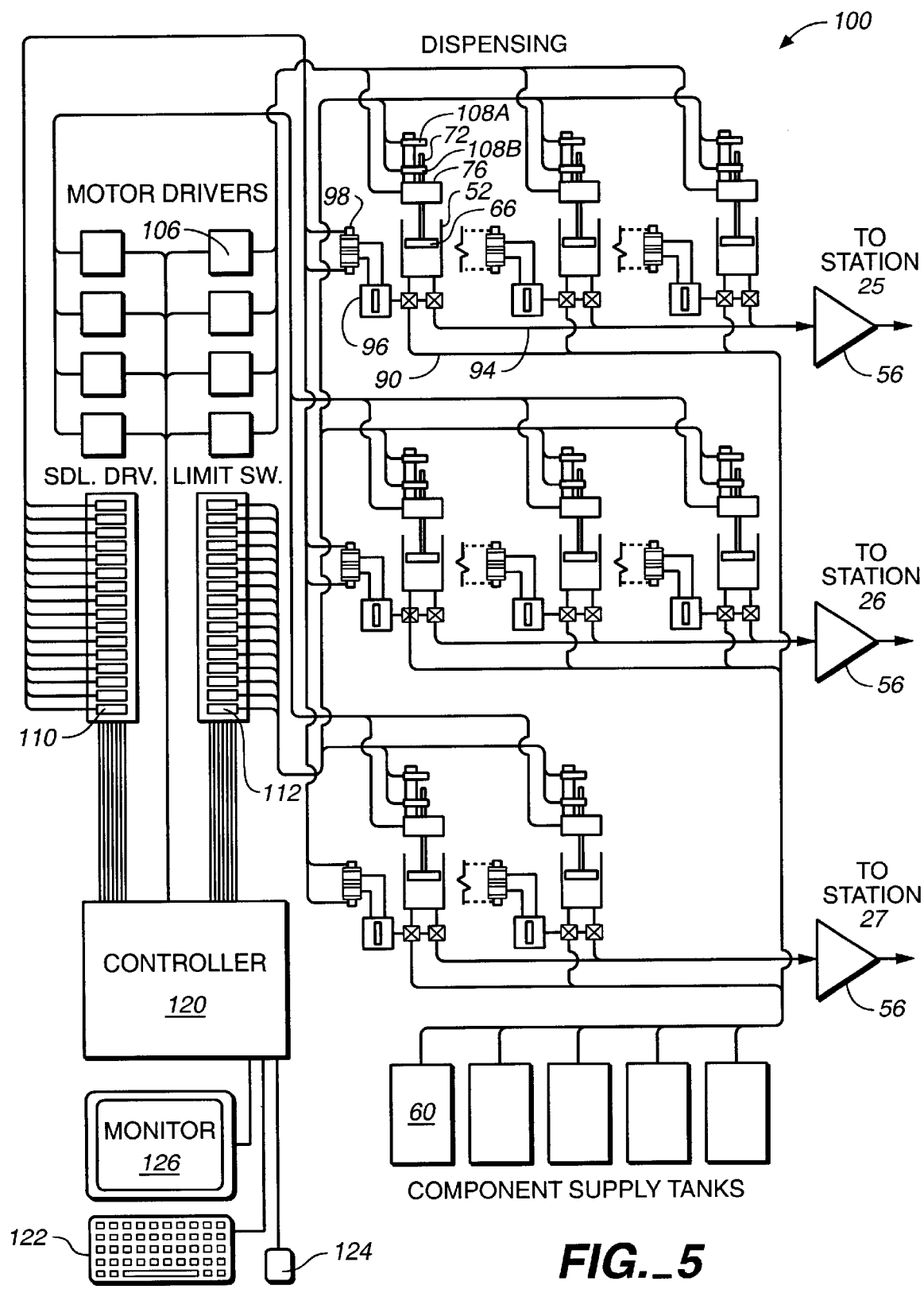
FIG._5

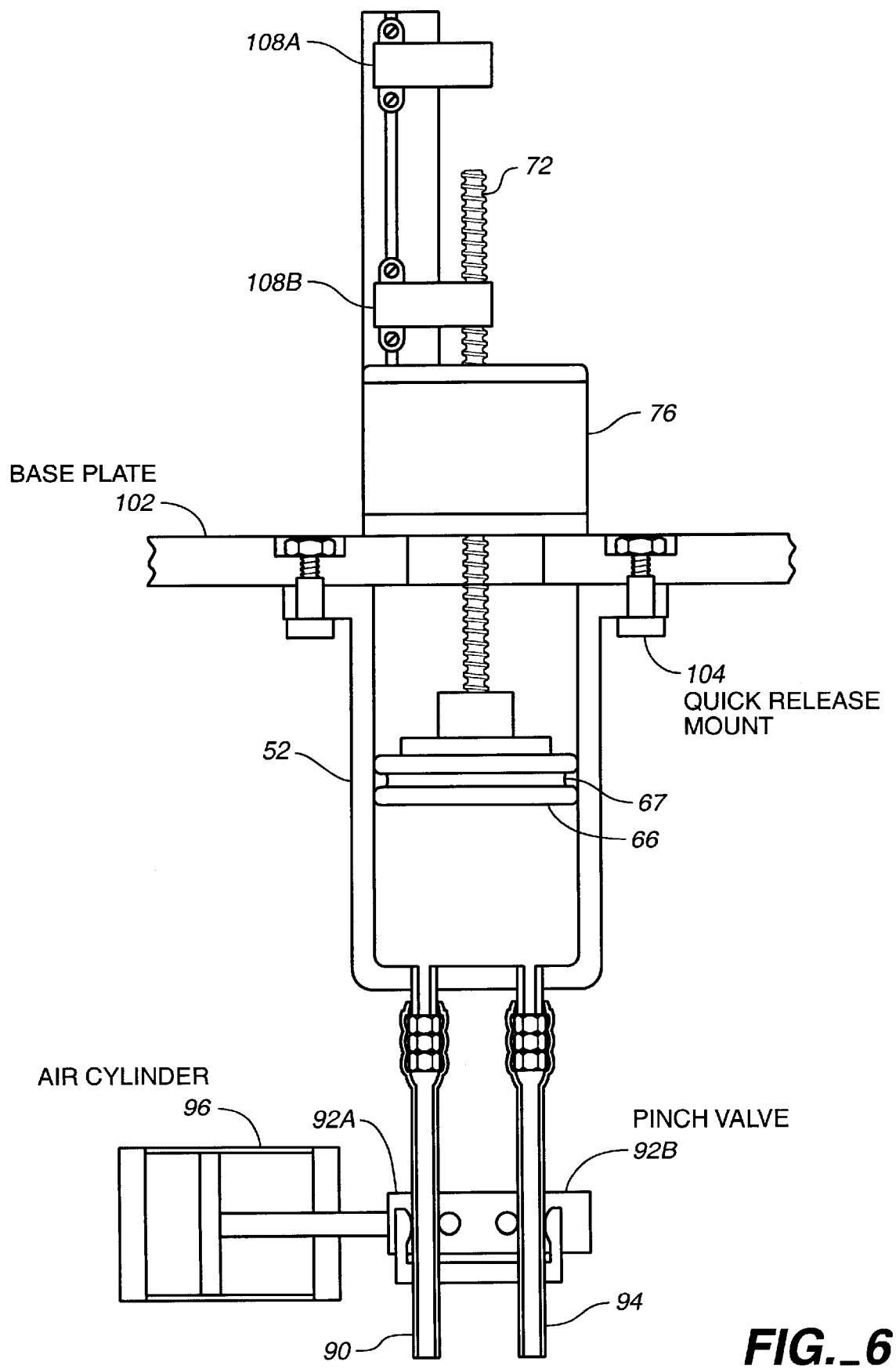
FIG._6

DELIVERY OF POLISHING AGENTS IN A WAFER PROCESSING SYSTEM

BACKGROUND

The invention relates generally to the delivery of polishing agents in a wafer processing system.

In the process of fabricating modern semiconductor integrated circuits (ICs), it is necessary to form various material layers and structures over previously-formed layers and structures. However, the prior formations often leave the top surface topography of an in-process wafer highly irregular, with bumps, areas of unequal elevation, troughs, trenches and/or other surface irregularities. Such irregularities cause problems when forming the next layer. For example, when printing a photolithographic pattern having small geometries over previously-formed layers, a very shallow depth of focus is required. Accordingly, it becomes essential to have a flat and planar surface. Otherwise, some parts of the pattern will be in focus and others will not. Surface variations on the order of less than 1,000 angstroms (D) over a 25×25 millimeter (mm) exposure area are preferred. Additionally, if the irregularities are not leveled at each major processing step, the surface topography of the wafer can become even more irregular, causing further problems as the layers stack up during further processing. Depending on the die type and the size of the geometries involved, the surface irregularities can lead to poor yield and device performance. Consequently, it is desirable to planarize, or level, the IC structures.

One technique for planarizing the surface of a wafer is chemical mechanical polishing (CMP). In general, CMP planarization involves holding a thin flat semiconductor wafer against a rotating wetted polishing surface, such as a compliant polishing pad, under a controlled downward pressure. During the CMP process, a slurry is provided to facilitate the polishing process. The slurry can result in higher removal rates of material from the surface being polished, as well as higher selectivity between various films and layers on the semiconductor substrate.

Typically, slurries used in CMP surface treatments include various constituents such as potassium hydroxide, silicon oxide, an oxidizer such as hydrogen peroxide, and a diluent such as de-ionized water. Other materials, such as ferric nitrate or chloride may also be present.

In the past, premixed bulk slurries have been used for CMP techniques. Unfortunately, some premixed slurries tend to gel quickly. As a result, such slurries can foul up the polishing system and lead to unevenly polished surfaces. Only a limited range of premixed slurries are available because of the balance required between the chemical stability of the slurry and the ability of the slurry to polish specified materials on the semiconductor substrate. Furthermore, the use of premixed slurries precludes dynamically changing the composition of the slurry.

In contrast to premixed slurries, slurry delivery systems have been proposed to deliver and mix the various slurry constituents just prior to the actual polishing. Unfortunately, some of the systems do not allow for sufficiently high precision and control with respect to the duration, amount and rate at which each slurry constituent is provided. A related problem encountered in some slurry delivery systems is that it is difficult to operate the system to dispense the slurry at a constant rate.

SUMMARY

In general, according to one aspect, a method of providing a polishing agent to a wafer processing station includes operating multiple motor-driven pistons automatically to dispense respective amounts of respective polishing agent constituents from respective containers. The dispensed polishing agent constituents are delivered to the wafer processing station.

As used herein, a "polishing agent" may include one or more fluids that are used during a CMP or other wafer polishing or buffing process. Examples of polishing agents include, for example, slurries, buffing agents, and cleansing agents, among others. A polishing agent may include one or more constituents.

According to another aspect, a polishing agent delivery apparatus for a wafer processing system includes multiple tanks each of which can hold a supply of a respective polishing agent constituent. The apparatus includes multiple containers, each one of which can hold a respective polishing agent constituent. Additionally, each container has a motor-driven piston that can be operated to cause the respective polishing agent constituent to be dispensed for delivery from the container to a wafer processing station and which can be operated to cause additional polishing agent constituent to be drawn into the container from a corresponding one of the tanks. The apparatus also includes a controller for controlling a respective rate of linear displacement of each motor-driven piston.

Various implementations may include one or more of the following features. The polishing agent delivery apparatus can include multiple stepper motors or servo-motors coupled to the controller. Each stepper motor can be coupled to a respective one of the pistons by a lead screw to control linear displacement of the piston to which it is coupled. Optical sensors can be used to provide signals indicative of the position of an associated one of the lead screws.

A sliding seal can be provided about the periphery of each piston. In some implementations, each container includes a diaphragm disposed between the piston and an end of the container through which the respective polishing agent constituent is dispensed. Each container also can include a hydraulic fluid disposed between its associated diaphragm and piston. The diaphragm can comprise an elostomer.

A first group of flexible hoses can be provided to connect the tanks to respective ones of the containers. A second set of flexible hoses can connect the containers to a delivery point adjacent the wafer processing station. Pinch valves or other valves which can be operated in open and closed states can be used to control flow of a polishing agent constituent between a respective one of the containers and associated ones of the flexible hoses. Air cylinders can be provided to control the states of the respective valves.

In some implementations, the pistons are operated to fill each container with approximately an amount of a respective polishing agent constituent substantially equal to the amount used during a single polishing cycle. The containers and hoses can be flushed with a cleansing fluid following one or more polishing cycles.

In yet another aspect, an apparatus for delivering a polishing agent to wafer processing stations in a wafer processing system includes multiple tanks each of which stores a supply of a polishing agent constituent. The apparatus also includes multiple groups of containers. Each container includes a motor-driven piston that can be operated to cause a respective polishing agent constituent to be dispensed for delivery from the container to a respective one of the wafer processing stations associated with the group of containers to which the container belongs. Each container can be operated to cause additional polishing agent constituent to be drawn into the container from a corresponding one of the tanks. The apparatus also has a controller for controlling a respective rate of linear displacement of each motor-driven piston.

Various implementations include one or more of the following advantages. The system allows changes to slurry mixtures or other polishing agents to be made quickly and efficiently, and different slurry or buffing mixtures can be used for different wafer processing stations. The rates at which one or more polishing agent constituents are dispensed can be altered dynamically from one wafer processing cycle to another, as well as during a wafer processing cycle. Furthermore, the system can provide tight control over the dispensing operations so that precise, predetermined amounts of each constituent are mixed into the slurry or other polishing agent. The system can be made highly modular to facilitate the delivery of slurry to additional polishing stations.

Other features and advantages will be apparent from the detailed description, the drawings and the claims.

BRIEF DESCRIPTION OF THE DRAWINGS

FIG. 1 is a schematic exploded perspective view of an exemplary chemical mechanical polishing apparatus in which the invention can be used.

FIG. 2 illustrates a first embodiment of a slurry delivery system according to the invention.

FIG. 3 illustrates a second embodiment of a slurry delivery system according to the invention.

FIG. 4 illustrates a third embodiment of a slurry delivery system according to the invention.

FIGS. 5 and 6 illustrate a further implementation of a slurry delivery system according to the invention.

DETAILED DESCRIPTION

As shown in FIG. 1, one or more wafers 10 can be polished by a chemical mechanical polishing apparatus 20. The polishing apparatus 20 includes a machine base 22 with a table top 24 that supports a series of polishing stations 25, 26, 27 and a transfer station 28.

The transfer station 28 serves multiple functions, including receiving wafers 10 from a loading apparatus (not shown), washing the wafers, and loading the wafers into carrier head assemblies 30 which form part of a rotatable multi-head carousel 38 supported above the polishing stations. The transfer station 28 also receives the wafers from the carrier head assemblies, washes the wafers again, and finally, transfers the wafers back to the loading apparatus.

Each polishing station 25, 26, 27 can include a standard polishing pad 32 adhesively attached to a circular platen 34. In addition, each polishing station has a combined slurry/rinse arm 36 that projects over the associated polishing surface. The slurry/rinse arm 36 can include slurry supply tubes to provide a polishing slurry or cleaning liquid to the surface of the polishing pad 32. Typically, a sufficient amount of slurry is provided to cover and wet the entire polishing pad. Each slurry/rinse arm can include several spray nozzles (not shown) to provide a high-pressure rinse at the end of each polishing and conditioning cycle. Each polishing station 25, 26, 27 also can include an optional associated pad conditioner apparatus 40. In some implementations, one of the stations, such as the station 27, can be used for buffing the wafers.

During operation of the system, each carrier head assembly can receive and hold a wafer, and can polish (or buff) the wafer by pressing it against the polishing pad 32 of one of the stations 25, 26, 27. The wafer can be rotated and moved across the surface of the polishing pad 32.

As shown in FIG. 2, a slurry delivery system 50 includes multiple cylindrical containers 52 each of which can hold a fluid constituent used for the slurry. Although four containers 52 are shown, fewer or more containers can be provided depending on the composition of the slurry to be used in the CMP process. Similarly, other shapes may be suitable for the containers 52. Preferably, each container 52 has a volume substantially equal to the amount of slurry constituent used during a single CMP process cycle. In one particular implementation, each container holds about one liter, although in general, the containers need not have the same volume.

Each container 52 is connected by a respective first hose 54 to a slurry mixer 56 which mixes the various constituents of the slurry prior to delivering the slurry to the slurry arm (FIG. 1). A valve 58 is provided along the length of each hose 54 between the associated container 52 and the mixer 56. Each valve 58 can be controlled to operate in either an open or closed position. Alternatively, check valves can be used to prevent the slurry constituents from flowing back into the mixer 56.

Each container 52 also is connected by a respective second hose 62 to an associated supply tank 60. Each supply tank 60 holds an additional supply of one of the slurry constituents. The tanks 60 are typically much larger than the containers 52 which can be refilled from the supplies stored in the tanks. A valve 64 is provided along the length of each hose 62 between the associated container 52 and the corresponding supply tank 60. Each valve 64 can be operated in either an open or closed position.

In one implementation, a respective piston 66 is disposed within each of the containers 52 and can be displaced linearly along the length of the container. The periphery of each piston 66 is provided with a relatively tight sliding seal 67, such as an O-ring, which allows the piston to slide smoothly along the inner surface of the container 52. The valves 58, 64 are operated so that when the piston 66 is moved in a first direction (indicated by the arrow 68), a slurry constituent is drawn into the container 52 from the corresponding tank 60 via the associated hose 62. Similarly, when the piston 66 is moved in a second direction (indicated by the arrow 70), the slurry constituent is pushed out of the container 52 into the corresponding hose 54 toward the mixer 56. In particular, displacement of the piston 66 in the second direction creates a positive pressure on the fluid in the container 52, thus causing the slurry constituent to be pushed out of the container and into the corresponding hose 54.

A respective drive rod, such as a lead screw 72, is connected to each piston 66 from the end of the container 52 opposite the opening 74 through which the slurry constituent passes. Each lead screw 72 can be engaged by a respective motor 76 to control the rate at which each slurry constituent is dispensed from its container 52. In many implementations, maximum rates of about 500 milliliters per minute can be used. The motors 76 can be, for example, either stepping motors or closed-loop servo-motors controlled by an electronic controller 78. Use of closed-loop servo-motors allows feedback to be provided to the controller 78 to adjust the relative dispensing rates. The controller 78 can be implemented, for example, using an appropriately programmed general purpose computer, microcomputer or special purpose computer. Although not shown, the controller 78 can be coupled to the valves 58, 64 to control whether each valve operates in an open or closed state.

Each motor 76 is coupled to the controller 78 which provides signals to establish the rate at which the motor drives the corresponding lead screw 72 to cause linear displacement of the piston 66 and, thus, dispense the corresponding slurry constituent. The controller 78 can be programmed to cause dispensing of each slurry constituent at a fixed rate or at a variable rate. When a motor 76 is operated at a substantially fixed speed, the slurry constituent in the corresponding container 52 is dispensed from the container at a substantially constant flow rate. More generally, the controller 78 can precisely establish the relative rates at which the slurry constituents are dispensed from the containers. The dispense rate of slurry constituent from one of the containers 52 depends on the rate at which the motor 76 causes linear displacement of the piston 66 and the cross-sectional area of the container holding the slurry constituent.

In one implementation, assuming the containers 52 have the same shape and cross-sectional area, the ratios of the speeds at which the motors 76 are operated will be about the same as the ratios of the rates at which the slurry constituents are dispensed from the containers. After a given amount of time elapses, the vertical positions of the pistons 66 will vary depending on the amount of slurry constituent dispensed from each corresponding container 52.

To illustrate, assume, for example, that the four containers 52 have the same dimensions, that the containers start with the same volume of slurry constituent, and that the relative speeds of the corresponding motors 76 are 4:3:2:1. After a particular amount of time elapses, the relative linear distances that the pistons are displaced will be approximately in the ratio of 4:3:2:1. Changing the speed at which one of the motors 76 operates changes the rate at which a slurry constituent is dispensed.

Once the slurry constituents are dispensed, they can be delivered to the mixer 56 (FIG. 1). The mixed slurry is delivered to a polishing station such as the station 26 via the slurry arm 36. After completion of a CMP cycle, for example, upon completion of polishing a single wafer, the controller 78 reverses the direction of the motors 76. The pistons 66 are pulled upward in the direction of the arrow 68 to introduce a new batch of slurry constituents into the containers 52 from the supply tanks 60. After refilling the containers 52, a new cycle of dispensing and mixing the slurry can begin.

In an alternative implementation shown in FIG. 3, one or more air pressure regulators 80 can be used to drive the pistons 66. In other words, the pistons 66 are driven by compressed air rather than by motor-driven lead screws. To mix the slurry with different ratios of constituents, the air pressure driving one or more of the pistons 66 can be varied.

In yet another implementation, the pistons 66 are isolated from the slurry constituents in the containers 52 by providing a respective diaphragm 82 in each container (FIG. 4). The diaphragm 82, which can help reduce leakage and contamination of the piston 66 and sliding seal 67, is positioned between the piston 66 and the distal end of the container 52 through which the slurry constituent is dispensed. The diaphragms 82 can comprise, for example, an elastomer, although other materials may be suitable as well. To reduce or prevent the diaphragm 82 from deflecting when the piston 66 is displaced linearly, a hydraulic fluid 84, such as oil, water, or some other incompressible liquid, can be provided between the diaphragm and the piston. Moving the piston 66 toward the distal end of the container 52 at a constant rate displaces the liquid 84 located between the piston and the diaphragm 82. That, in turn, causes displacement of the diaphragm and, thus, the slurry constituent. The slurry constituent can, therefore, be dispensed from the container 52 at a substantially constant flow rate.

FIG. 5 illustrates a slurry delivery system 100 that can be used to deliver slurry to multiple polishing stations. For example, in one implementation, the system 100 delivers slurry to the stations 25, 26 (FIG. 1). FIG. 6 illustrates further details of an apparatus for dispensing a slurry constituent from one of the cylindrical containers 52 using a motor-driven piston. Components in FIGS. 5 and 6 that are similar to components in the previously-discussed drawings are identified by the same reference numerals.

A lead screw 72, which couples a linear stepper-motor (or servo-motor) 76 to the piston 66, extends through a base plate 102 into the container 52. The base plate 102 can be connected to the top of the container 52 using quick release mounts 104 (FIG. 6). A controller 120 controls motor drivers 106 to drive the motors 76.

Multiple large supply tanks 60 store various slurry constituents to be provided to one or more cylindrical containers 52 via flexible hoses 90. Some of the containers 60 may contain chemical neutralizers, anti-corrosive materials, or de-ionized water. A pinch valve 92A positioned along each hose 52 can be used to permit or prevent the flow of a slurry constituent from the tank 60 into the container 52. Similarly, a slurry constituent dispensed from the one of the containers 52 can be provided to a mixer 56 associated with a respective one of the polishing stations via another flexible hose 94. Another pinch valve 92B positioned along each hose 94 can be used to permit or prevent the flow of a slurry constituent from the container 52 to the associated mixer 56. An air cylinder 96 controls the respective states of the pinch valves 92A and 92B. The air cylinder 96, in turn, is controlled by an air solenoid 98 which converts electrical signals from a pair of solenoid drivers 110 to air signals. The solenoid drivers 110 are controlled by the controller 120. In general, the air cylinder 96 is controlled so that one of the valves 92A, 92B is closed while the other value is open. After processing one or more wafers, the hoses 90, 94 and containers 52 can be flushed by providing a cleaning fluid, such as de-ionized water, from one of the tanks 60. Thus, for example, the slurry delivery system can be flushed between polishing batches of wafers. During the flushing operation, air flow to the air cylinder 96 can be turned off to allow both valves 92A, 92B to be open.

A pair of optical slotted switches 108A, 108B is associated, respectively, with each stepper-motor 76. Each optical switch can include, for example, a light-emitting diode (LED) and a photodetector and can be mounted in a T-slot. The upper optical switch 108A is blocked when the lead screw 72 reaches its highest position. Similarly, the lower optical switch 108B is unblocked when the lead screw 72 reaches its lowest position. Signals from the optical switches 108A, 108B are provided to respective limit switches 112 which provide input signals to the controller 120. Monitoring those signals allows the controller 120 to determine whether the lead screw 72 and piston 66 are positioned at the proper height during operation.

The controller 120 can be implemented, for example, as a personal computer with an input/output (I/O) card and a motion control card. Input devices such as a keyboard 122 and/or mouse 124 can be used for entering data and/or instructions to the controller, and a display monitor 126 can be provided for viewing output data. The controller 120 also can be coupled to the CMP system 20 (FIG. 1).

The systems described above allow the content of the slurry to be altered dynamically from one polishing cycle to the next polishing cycle, as well as during a polishing cycle. For example, it some cases, it may be desirable to polish a wafer with slurry and surfactants at the beginning of the cycle and use de-ionized water, chemical neutralizers and/or corrosion inhibitors at the end of the polishing cycle.

In some implementations, two of the stations, for example stations 25, 26, can be used for wafer polishing, and the third station 27 may be used for wafer buffing. In that case, some of the tanks 60 would store slurry constituents and other tanks would store buffing agents. One or more groups of containers can be used for dispensing the slurry constituents while other groups of containers are used for dispensing the buffing agent(s). The dispensed materials are be provided to a corresponding one of the mixers 56 prior to delivery to as associated one of the stations 25, 26, 27. As already discussed, another one of the tanks 60 can store water or another cleansing agent for use during flushing operations.

Other implementations are within the scope of the claims.

What is claimed is:

1. A polishing agent delivery apparatus for a wafer processing system, the polishing agent delivery apparatus comprising:

a plurality of tanks each of which can hold a supply of a respective constituent of the polishing agent;

a plurality of containers each of which can hold a respective polishing agent constituent and each of which has a motor-driven piston that can be operated to cause the respective polishing agent constituent to be dispensed for delivery from the container to a wafer polishing station and which can be operated to cause additional polishing agent constituent to be drawn into the container from a corresponding one of the tanks, each container including a diaphragm disposed between the piston and an end of the container through which the respective polishing agent constituent is dispensed, wherein each container includes a hydraulic fluid disposed between its associated diaphragm and piston; and a programmed controller that automatically controls a respective adjustable rate of linear displacement of each motor-driven piston to dispense polishing agent constituents from the containers and that controls the pistons to draw the additional polishing constituents into the containers.

2. The polishing agent delivery apparatus of claim 1 including a plurality of stepper motors coupled to the controller, wherein each stepper motor is further coupled to a respective one of the pistons to control linear displacement of the piston to which it is coupled.

3. The polishing agent delivery apparatus of claim 2 wherein each stepper motor is coupled to a respective one of the pistons by a lead screw.

4. The polishing agent delivery apparatus of claim 3 further including a plurality of optical sensors having respective outputs coupled to the controller, wherein the sensors are positioned to provide signals indicative of the linear position of the lead screw.

5. The polishing agent delivery apparatus of claim 8 including a plurality of closed-loop servo motors coupled to the controller, wherein each servo motor is further coupled to a respective one of the pistons to control linear displacement of the piston to which it is coupled.

6. The polishing agent delivery apparatus of claim 1 including:

a first group of flexible hoses connecting the plurality of tanks to respective ones of the containers and a second set of flexible hoses connecting the containers to a delivery point adjacent the wafer polishing station; and a plurality of pinch valves each of which can be operated in an open and closed state to control flow of a polishing agent constituent between a respective one of the containers and associated ones of the flexible hoses.

7. The polishing agent delivery apparatus of claim 6, including air cylinders for controlling the states of the respective pinch valves.

8. The polishing agent delivery apparatus of claim 1 wherein at least some of the tanks contain slurry constituents.

9. The polishing agent delivery apparatus of claim 1 wherein the diaphragm comprises an elastomer.

10. The polishing agent delivery apparatus of claim 1 including a respective sliding seal about the periphery of each piston.

11. A polishing agent delivery apparatus for a wafer processing system, the polishing agent delivery apparatus comprising:

a plurality of tanks each of which can hold a supply of a respective constituent of the polishing agent;

a plurality of containers each of which can hold a respective polishing agent constituent and each of which has a motor-driven piston that can be operated to cause the respective polishing agent constituent to be dispensed for delivery from the container to a wafer polishing station and which can be operated to cause additional polishing agent constituent to be drawn into the container from a corresponding one of the tanks, wherein each container includes a diaphragm disposed between the piston and an end of the container through which the respective polishing agent constituent is dispensed and further including a hydraulic fluid disposed between the diaphragm and piston; and a programmed controller that automatically controls a respective rate of linear displacement of each motor-driven piston to dispense polishing agent constituents from the containers and that controls the pistons to draw the additional polishing constituents into the containers.

* * * * *